(12) United States Patent
Shi

(10) Patent No.: US 7,382,958 B1
(45) Date of Patent: *Jun. 3, 2008

(54) PHOTONIC CRYSTAL WAVE GUIDE OPTICAL SPECTROMETER

(76) Inventor: Feng Shi, 2705 Kendale Dr., Apt. 201, Toledo, OH (US) 43606

( * ) Notice: Subject to any disclaimer, the term of this patent is extended or adjusted under 35 U.S.C. 154(b) by 0 days.

This patent is subject to a terminal disclaimer.

(21) Appl. No.: 11/593,228

(22) Filed: Nov. 6, 2006

(51) Int. Cl.
*G02B 6/02* (2006.01)

(52) U.S. Cl. ............... 385/123; 385/122; 385/126; 385/127; 385/28; 385/48; 359/317; 359/320; 359/322; 398/86; 398/91

(58) Field of Classification Search ........... 359/322; 385/123, 48
See application file for complete search history.

(56) References Cited

U.S. PATENT DOCUMENTS 7,075,705 B1 * 7/2006 Koops et al. ............... 359/322
7,231,122 B2 * 6/2007 Weisberg et al. ........... 385/123

OTHER PUBLICATIONS

Daniel Malacara, Geometrical and Instrumental Optics, Methods of Experimental Physics, vol. 25, pp. 190-237, Academic Press Inc, 1988, US.

* cited by examiner

*Primary Examiner*—Frank G. Font
*Assistant Examiner*—Guy G Anderson

(57) ABSTRACT

An optical instrument for splitting optical spectrum, comprising a series of hollow core optical wave guides (12, 22, and so on) connected by optical couplers (16, 26, and so on) transporting broad band incident optical wave from one stage to another, a narrow band optical wave guide (14, 24, and so on) made of photonic crystal materials mounted inside each of said hollow core optical wave guide and along it, and specified for confining certain portion of the incident optical spectrum. Said inner narrow band optical wave guides bend out at the ends of said outer hollow core optical wave guides to extract and guide out the selected component of the incident optical spectrum. Said optical couplers couple the output optical waves of said outer hollow core wave guides of the previous stages into said inner optical wave guides of the next stages for further splitting.

8 Claims, 2 Drawing Sheets

PHOTONIC CRYSTAL WAVE GUIDE OPTICAL SPECTROMETER

CROSS-REFERENCE TO RELATED APPLICATION not applicable

FEDERALLY SPONSORED RESEARCH not applicable

SEQUENCE LISTING OR PROGRAM not applicable

BACKGROUND OF THE INVENTION

1. Field of Invention

This invention generally relates to optical instruments, specifically to such instruments which are used for splitting optical spectrum.

2. Prior Art

Rainbow after raining often shows astonishing beauty in sky. The beautiful colors come from the broad band sunlight. When the individual components of the broad band spectrum of sunlight are separated through the refraction of the water drops in wetting air, a spectacular arch forms in sky. As in nature, in scientific fields, it is often necessary to split broad band optical spectrums and separate their individual components. The instruments used to separate or analyze light according to wavelength are known as spectroscopic instruments or spectrometers. The overall form of most current spectrometers is of an imaging system which consists of 3 principle components[1], collimating unit made of collimating lens, spectral unit, and camera or telescope unit made of focusing lens. The collimating unit collimates the input light into parallel beam light, the spectral unit separates the beam light and the camera or telescope unit output the separated components. In terms of image systems, by locating the spectral unit in the aperture stop of the system, the arrangement of the system is able to form a chromatically altered image of the entrance aperture or field stop. The field of view is defined by a field stop in the front focal plane of the collimating lens. The focusing lens completes the imaging of the field stop.

The spectral unit is the fundamental component of all spectrometers. In and near the visible region of the spectrum, this unit is usually a prism, a grating, a Fabry-Perot etalon, or a version of the Michelson interferometer[1]. These spectral units operate on plane waves. Prisms change the directions of these waves according to wavelength; gratings multiply and disperse them; etalons and Michelson interferometers change the irradiance of the waves according to their angle and wavelength. The collimating optics creates plane wave from the light emanating from each point in the entrance aperture. The focusing lens brings each plane wave leaving the spectral unit to a different point and makes the output ultimately analyzed spatially.

Therefore, all the spectrometers heretofore known suffer from a number of disadvantages:

(a) The overall form of most of the current spectrometers is a imaging system, it can only process beam light and plane waves, there is nothing to do with diffusion light and other type waves.

(b) In the current spectrometers, the beam light propagates in free space, therefore it can not be guided and distributed desirably.

(c) The resolving power of the current spectrometers is limited by the spectral separation mechanism.

(d) Single spectrometer can not cover broad range of spectrum in the mean time.

(e) The power throughput is limited by the intuitive nature of the current spectrometers, they are not appropriate to be used as power process equipment.

(f) The structure of the current spectrometers is complicate.

(g) The whole system of the current spectrometers is not compact.

(h) The structure of the current spectrometers is precise, so the whole system is not robust.

(i) The current spectrometers are usually used as independent spectral analyzing instrument, it is not easy to be integrated into other systems.

(j) The spectrometers in present use consisting of precise optics are very expensive.

As can be seen, the intuitive nature of the currently existing spectrometers limit their application to processing beam light and plane waves, there is nothing to do with diffusion light and other type of waves. The collimation optics and output optics are usually necessary for spectrometers to carry out spectrum separation function, this makes the structure of these systems too complicate. The input beam and output of the spectrometers all propagate in free space without guidance, therefore it is not easy to realize energy separation and collection of elements of broad band optical spectrum. The current spectrometers are more eligible to analyze spectrum. From the point view of energy application, the mechanisms of the currently existing spectrometers are not efficient in separation and collection of elements of broad band optical spectrum. The currently existing spectrometers depend on the aids of input optics and output optics to realize effective separation of broad band spectrum, the systems perform very well in spectral analysis and information process. However, they are not effective in carrying out spectral energy separation of broad band spectrum. Due to the complicate structure of spectrometers, they are not compact. In terms of power transportation, the currently existing spectrometers are not effective.

OBJECTS AND ADVANTAGES

Accordingly, the objects and advantages of the present invention are:

(a) to provide a spectrometer which can process both beam light and diffusion light in the mean time.

(b) to provide a spectrometer which allow high intensity of light get through with low loss.

(c) to provide a spectrometer which can confine and guide the light letting it flow in a desirable way.

(d) to provide a spectrometer which has high resolving power in any range of spectrum.

(e) to provide a spectrometer which covers broad band spectrum with single instrument.

(f) to provide a spectrometer which has simple structure.

(g) to provide a spectrometer which is compact.

(h) to provide a spectrometer which has a robust mechanism to separate spectrum and therefore is reliable.

(i) to provide a spectrometer which can be easily integrated into power transportation systems.

(j) to provide a spectrometer which is cheap.

Further objects and advantages are to provide a spectrometer which allow high density light get through and process beam light, diffusion light and mixture of beam and diffusion light, which functions as optical wave guide to guide input light and separated output components of spectrum and distribute them to desirable destinations, which has simple structure and is compact, which has simple working mechanism and is reliable, which is effective and efficient in separation of broad band spectrum, which can cover broad range of optical spectrum, which can be easily coupled with other instruments and integrated into other systems. The whole system is based on optical wave guide and photonic crystal theory that are totally different from diffraction and interference theory.

SUMMARY

In accordance with the present invention a spectrometer comprises a series of hollow optical wave guides, with a series of hollow photonic crystal optical waves mounted inside of the said hollow optical wave guides and a series of optical couplers coupling the said hollow optical wave guides to the said hollow photonic crystal optical wave guides.

DRAWINGS

FIGURES

Figure 1:
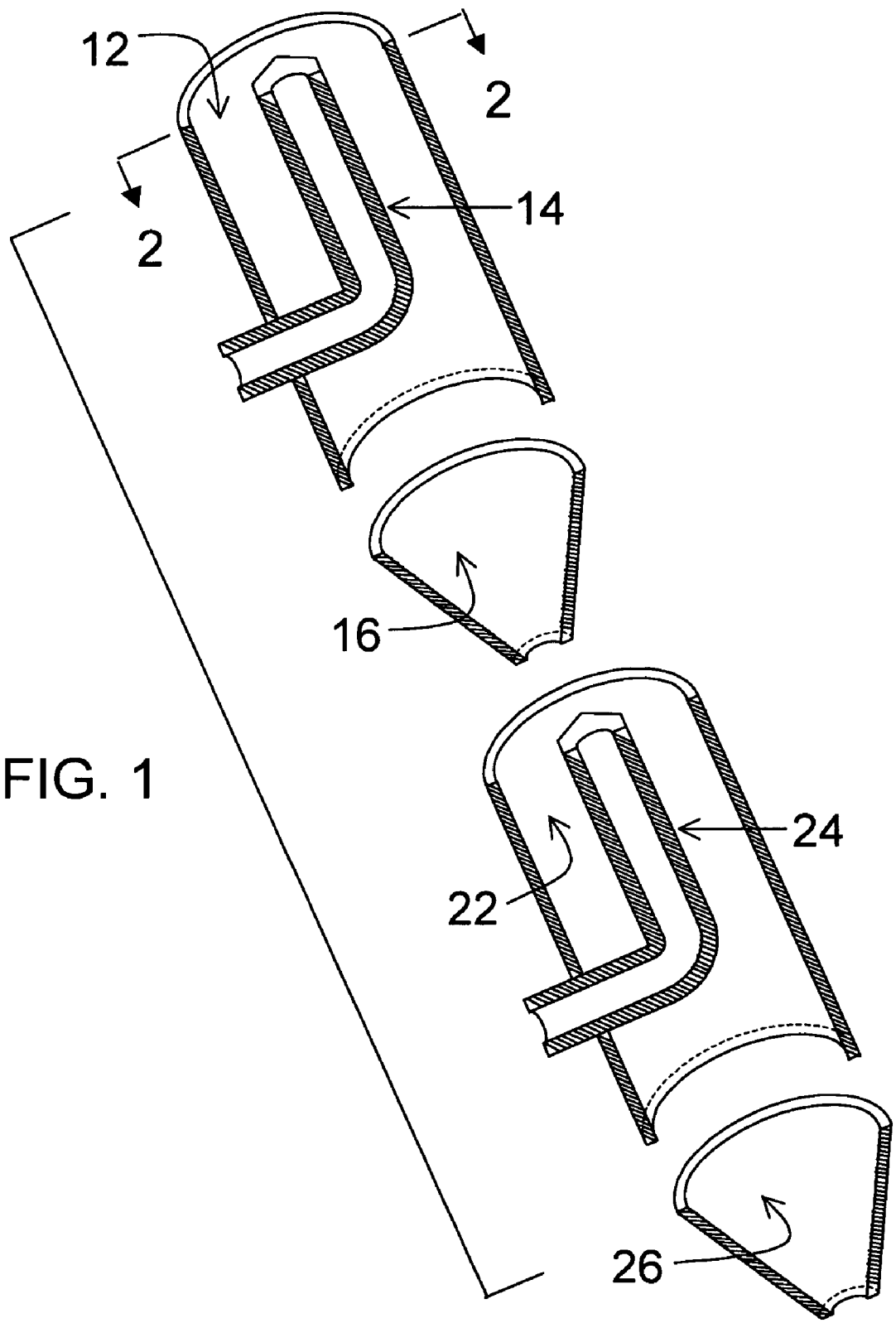
FIG. 1 shows the cross-section view of 2 of the stages, which are connected in series, of the photonic crystal wave guide optical spectrometer system.

REFERENCE NUMERALS 12 hollow optical wave guide of the first stage.
14 photonic crystal optical wave guide of the first stage.
16 coupler of the first stage.
22 hollow optical wave guide of the second stage.
24 photonic crystal optical wave guide of the second stage.
26 coupler of the second stage.

DETAILED DESCRIPTION

Figure 2:
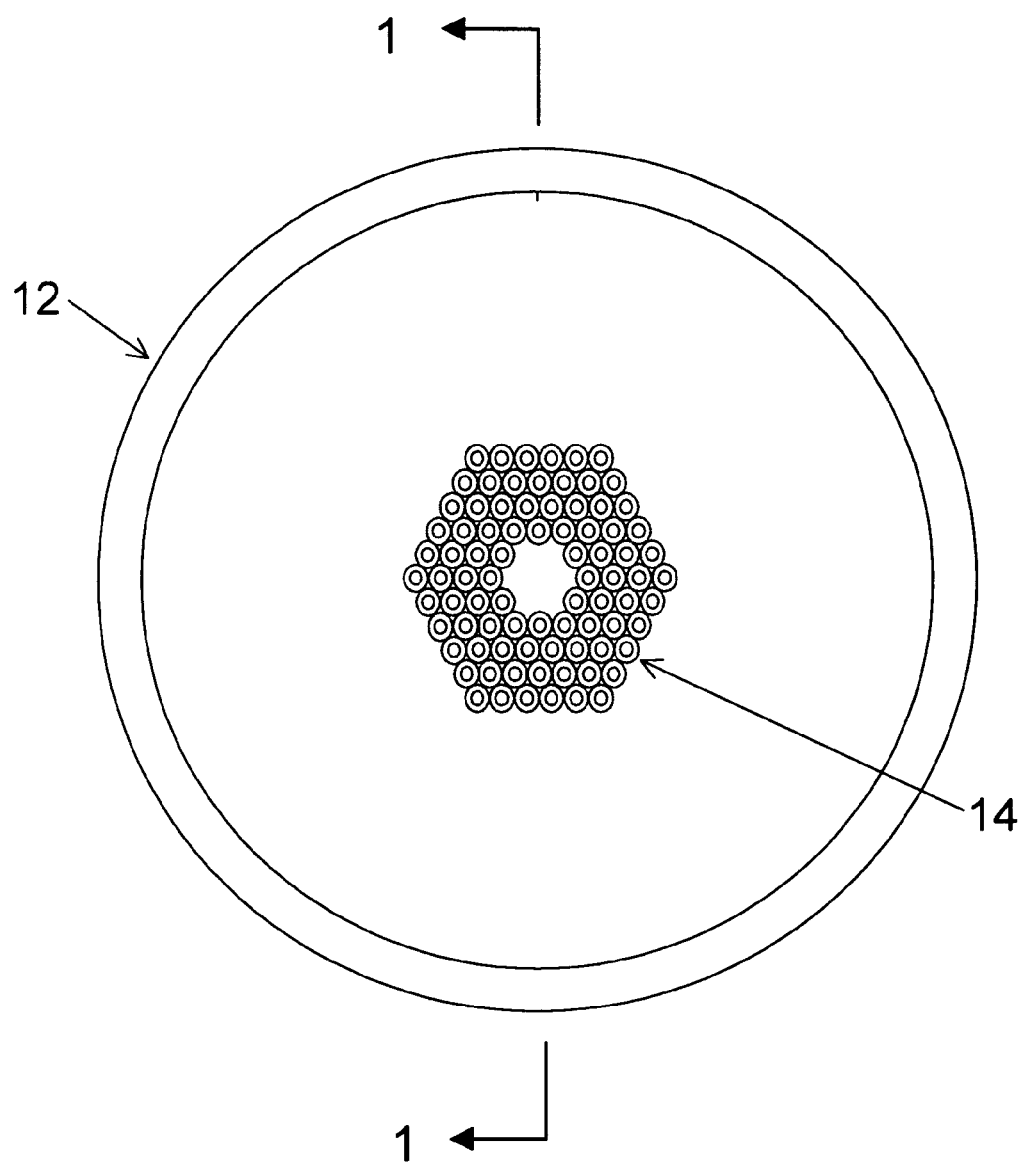
FIG. 2 shows the top end view of 1 of the stages of the spectrometer system.

FIGS. 1 to 2

PREFERRED EMBODIMENT

A preferred embodiment of the spectrometer of the present invention is illustrated in FIG. 1 (cross section view), and FIG. 2 (top end view). The spectrometer is made of a train of hollow optical wave guide groups connected each other with couplers, each group is known as a stage. In FIG. 1, only 2 of the stages are shown, there could be many stages depending on how broad of the broad band spectrum to be separated is and how many components the broad band spectrum is separated into. Each stage has a hollow optical wave guide 12 which must be able to confine and guide the whole input broad band spectrum light, and a photonic crystal optical wave guide 14 mounted inside of the hollow optical wave guide 12. As shown in FIG. 1, the photonic crystal optical wave guide 14 with its input aperture close to the input aperture of the hollow optical wave guide 12 extends down the hollow optical wave guide 12 and bends out it before its output aperture. The output aperture of the hollow optical wave guide 12 of the first stage is connected to the input aperture of the photonic crystal optical wave guide 24 of the second stage with the first coupler 16 which must be able to couple the whole input broad band spectrum light into the photonic crystal optical wave guide 24 in the second stage. So on and so forth, each stage is connected to the next stages to form a long chain of the spectrometer of the present invention. As shown in FIG. 2, the photonic crystal optical wave guide 14 in the first stage is made of any types of photonic crystal which could be 1, 2 and 3 dimensional photonic crystal band gap materials whose lattice structures are specified to confine the first component of the input broad band spectrum. Then the photonic crystal optical wave guide 24 in the second stage is specified to confine the second component of the input broad band spectrum. So on so forth, each of the photonic crystal optical wave guide in each of the stage is specified to confine one of the specific components of the input broad band spectrum.

Operation—FIG. 1

The manner of using the photonic crystal wave guide optical spectrometer to separate broad band optical spectrum is much simpler than that of spectrometer in present use. Namely, one just couples whatever broad band spectrum light onto the input aperture of photonic crystal optical wave guide of the first stage of the spectrometer, then the first component of the input broad band spectrum light, which the first photonic crystal optical wave guide is specified to extract, is confined in the photonic crystal optical wave guide 14 and guided out the hollow optical wave guide 12, the rest of the components are released into the hollow optical wave guide and are guided to the output aperture and further coupled to the input aperture of the second photonic crystal optical wave guide 24 by the coupler 16. Then the above procedure is repeated in the second stage, and the second component of the input broad band spectrum is extracted. So on so forth, after several stages, all the components of the broad band spectrum light are extracted out and guided to different destinations.

ADDITIONAL EMBODIMENT

Additional embodiment can be the case, each of the hollow photonic crystal optical wave guide can be a bundle of hollow photonic crystal optical fibers.

ALTERNATIVE EMBODIMENTS

There are various possibilities with regard to shape of the cross section of hollow optical wave guide, which could be circle, triangle, rectangle and so on.

ADVANTAGES

From the description above, a number of advantages of my photonic crystal wave guide optical spectrometer become evident:

(a) The spectrometer of the present invention is based on optical wave guide and photonic crystal theory rather than diffraction and interference theory to separate broad band optical spectrum, this enable it to process beam light, diffusion light and mixture of beam and diffusion light any types of input light.

(b) The spectrometer of the present invention itself works as optical wave guide to guide and distribute optical energy flowing.

(c) The spectrometer of the present invention made of hollow optical wave guide allows high intensity optical power get through with low loss.

(d) With large number of stages, the spectrometer of the present invention can cover very broad optical spectrum.

(e) The mechanism for splitting broad band optical spectrum used in the spectrometer is effective and reliable.

(f) The structure of the spectrometer of the present invention is simple and compact.

(g) The spectrometer of the present invention is easy to couple with instrument and therefore easy to be integrated into system.

(h) The spectrometer of the present invention obviate the need of precise, high quality and expensive optics and makes itself exclusively cheap.

CONCLUSION, RAMIFICATIONS, AND SCOPE

Accordingly, the readers will see that the photonic crystal wave guide optical spectrometer of the present invention can be used to process high intensity power flux in any type of phases, beam light or diffusion light or mixture of them, can easily separate any elements of broad band spectrum and deliver them to any desirable destinations, can easily separate input light with any broad band spectrum with large enough number of stages, can transport high intensity power with low loss, can be manufactured and assembled very easily, can be integrated into system easily. And in addition, the structure of the spectrometer of the present invention is simple and compact, this makes the instrument cheap and be readily used in wide field.

Furthermore the photonic crystal wave guide optical spectrometer has the additional advantages in that:

(a) Since it works as optical wave guide as well, it facilitates the assembling of instruments into systems.

(b) It facilitates the other instruments such as solar collectors to work well.

Although the description above contains many specificities, these should not be construed as limiting the scope of the invention but as merely providing illustrations of some of the presently preferred embodiments of this invention. For examples, the cross section of the splitter could have other shapes, such as triangular, rectangular and so on. Thus the scope of the invention should be determined by the appended claims and their legal equivalents, rather than by the examples given.

REFERENCES

Daniel Malacara, Methods of Experimental Physics 25, Geometrical and Instrumental Optics, 190-237 (1988).

I claim:

1. An optical instrument for splitting optical spectrum, comprising:
    a plurality of hollow core optical wave guide stages comprising an input end and an output end connected in series by optical couplers, said couplers being capable of transmitting a broad band incident optical signal from each stage of hollow core optical waveguide to the next stage of hollow core optical waveguide in series;
    wherein each stage comprises:
    a photonic crystal optical waveguide comprising an input end and an output end, said photonic crystal optical waveguide being capable of transmitting a predetermined narrow band optical signal; wherein a said photonic crystal optical waveguide is mounted inside the respective hollow core optical wave guide;
    wherein each of the said photonic crystal optical waveguides has a bend at the output end such that it exits the hollow core optical waveguide at a predetermined angle such that the selected narrow band component of the incident optical spectrum is guided out of the hollow core optical waveguide.

2. The optical spectrometer of claim 1, wherein the photonic crystal optical waveguide comprises a bundle of hollow photonic crystal fibers.

3. The optical spectrometer of claim 1, wherein the hollow core optical waveguide has a cross section that is substantially circular.

4. The optical spectrometer of claim 1, wherein the hollow core optical waveguide has a cross section that is substantially triangular.

5. The optical spectrometer of claim 1, wherein the hollow core optical waveguide has a cross section that is substantially rectangular.

6. The optical spectrometer of claim 2, wherein the hollow core optical waveguide has a cross section that is substantially circular.

7. The optical spectrometer of claim 2, wherein the hollow core optical waveguide has a cross section that is substantially triangular.

8. The optical spectrometer of claim 2, wherein the hollow core optical waveguide has a cross section that is substantially rectangular.

* * * * *